United States Patent
Harding

(10) Patent No.: US 9,200,458 B2
(45) Date of Patent: Dec. 1, 2015

(54) NON-STRUCTURAL INSULATING PANEL SYSTEM

(71) Applicant: Peter W. Harding, Chester, CT (US)

(72) Inventor: Peter W. Harding, Chester, CT (US)

(*) Notice: Subject to any disclaimer, the term of this patent is extended or adjusted under 35 U.S.C. 154(b) by 0 days.

(21) Appl. No.: 14/274,839

(22) Filed: May 12, 2014

(65) Prior Publication Data

US 2014/0237929 A1 Aug. 28, 2014

Related U.S. Application Data

(63) Continuation of application No. 13/181,426, filed on Jul. 12, 2011, now Pat. No. 8,726,598.

(60) Provisional application No. 61/399,480, filed on Jul. 13, 2010.

(51) Int. Cl.

| | |
|---|---|
| *E04F 13/08* | (2006.01) |
| *B66F 9/14* | (2006.01) |
| *B66F 9/18* | (2006.01) |
| *E04C 2/00* | (2006.01) |
| *E04G 21/16* | (2006.01) |
| *E04B 7/22* | (2006.01) |
| *E04D 13/064* | (2006.01) |
| *E04D 13/076* | (2006.01) |

(Continued)

(52) U.S. Cl.
CPC ............. *E04F 13/0885* (2013.01); *B66F 9/142* (2013.01); *B66F 9/185* (2013.01); *E04B 7/22* (2013.01); *E04C 2/00* (2013.01); *E04D 13/064* (2013.01); *E04D 13/0645* (2013.01); *E04D 13/076* (2013.01); *E04D 13/08* (2013.01); *E04D 13/158* (2013.01); *E04G 21/167* (2013.01); *E04B 1/762* (2013.01); *E04D 2013/045* (2013.01); *E04D 2013/0806* (2013.01); *Y02B 30/94* (2013.01)

(58) Field of Classification Search
CPC ........... E04C 2/205; E04C 2/384; E04C 2/06; E04C 2/18; E04C 2002/047; E04G 17/06; E04G 21/167; E04B 1/762; E04B 7/22; E04F 13/0885
USPC ........ 52/404.1, 404.2, 309.11, 309.16, 407.1, 52/506.01, 426, 416, 782.1, 783.1, 794.1, 52/309.4

See application file for complete search history.

(56) References Cited

U.S. PATENT DOCUMENTS 2,964,821 A * 12/1960 Meehan .................. 425/110
3,305,991 A * 2/1967 Weismann .............. 52/309.11

(Continued)

*Primary Examiner* — Brian Glessner
*Assistant Examiner* — Adam Barlow

(57) ABSTRACT

An insulating panel structure has an inner surface for attachment to a building exterior and an outer surface for attachment to cladding material. The panel structure has external stringers for attachment of the cladding, connectors extending perpendicularly from the inner surface to the external stringers to transmit compressive forces from the cladding to the building, lateral connectors that run diagonally upward from the external stringers to the inner surface to transmit tensile forces from the weight of the cladding to the building, and insulating foam embedded between the panel inner and outer surfaces. A panel application method includes providing panels with tubular connectors and providing expansible fingers insertable into the tubular connectors and mounted on a movable frame, inserting the fingers into the tubular connectors, expanding them to grip the tubes and panels, moving the frame with expanded fingers and panel to a job site, attaching the panel to a building while being held with the expanded fingers, and contracting and retracting the fingers from the attached panel.

3 Claims, 13 Drawing Sheets

(51) Int. Cl.
*E04D 13/08* (2006.01)
*E04D 13/158* (2006.01)
*E04B 1/76* (2006.01)
*E04D 13/04* (2006.01)

(56) References Cited

U.S. PATENT DOCUMENTS

| | | | |
|---|---|---|---|
| 3,523,055 A * | 8/1970 | Lemelson | 428/72 |
| 3,750,355 A * | 8/1973 | Blum | 52/309.12 |
| 4,297,820 A * | 11/1981 | Artzer | 52/309.11 |
| 4,336,676 A * | 6/1982 | Artzer | 52/309.7 |
| 4,924,641 A * | 5/1990 | Gibbar, Jr. | 52/204.1 |
| 6,226,942 B1 * | 5/2001 | Bonin | 52/309.12 |
| 6,279,293 B1 | 8/2001 | Ojala | |
| 6,282,853 B1 * | 9/2001 | Blaney et al. | 52/223.7 |
| 6,701,683 B2 * | 3/2004 | Messenger et al. | 52/309.11 |
| 6,898,908 B2 * | 5/2005 | Messenger et al. | 52/268 |
| 7,162,845 B2 * | 1/2007 | Messiqua | 52/404.1 |
| 2003/0029107 A1 * | 2/2003 | Ritter et al. | 52/309.11 |
| 2006/0263575 A1 | 11/2006 | Ritchie | |
| 2008/0155919 A1 * | 7/2008 | Keshishian et al. | 52/309.11 |
| 2009/0007519 A1 * | 1/2009 | Keshishian et al. | 52/794.1 |

* cited by examiner

NON-STRUCTURAL INSULATING PANEL SYSTEM

CROSS-REFERENCE TO RELATED APPLICATION

This application is a continuation of application Ser. No. 13/191,426, filed Jul. 12, 2011, which issued as U.S. Pat. No. 8,726,598 on May 20, 2014, and which claimed the benefit of the filing date of Provisional Application No. 61/399,480, filed Jul. 13, 2010.

FIELD OF THE INVENTION

This invention relates to systems and structures for insulating the walls and roofs of buildings.

BACKGROUND OF THE INVENTION

Energy consumption in residential and commercial buildings is estimated to account for 21% and 18% respectively of primary energy consumption in the USA. Given the projected decline in the production of fossil fuels and the growth in global demand for energy it is recognized in both the public and private sectors that reducing energy consumption in residential and commercial buildings is an international imperative.

The commonest construction system used in the USA and in many other countries in both the residential and the commercial sectors is a structural frame that is covered by a weatherproof cladding. The structural frame is designed to withstand all the loadings on the building due to the weight of the building itself and of the finishes, occupants and equipment inside the building. Depending on the geographical location of the building it may also be designed to accommodate additional loadings due to external environmental factors such as snow, wind or seismic activity. The structural frame also provides the support for the windows, doors and other penetrations of the building envelope. The cladding material is designed to prevent the ingress of rain, moisture, air and other undesirable elements into the building and is commonly selected based on a combination of performance and aesthetic considerations.

Although different materials are used in residential and commercial construction the principles of this frame and cladding building system are the same in both sectors. Residential and light-commercial construction typically uses wood as the framing material while larger commercial construction uses steel. Residential and light-commercial construction commonly uses wood products as the exterior cladding (e.g. clapboards, shingles) although other materials (e.g. vinyl, fiber-cement) are increasingly used for cost and durability reasons. Commercial buildings use a variety of claddings including sheet metal, glass, cementitious boards, stucco and the like. Additional materials may also be used between the structural frame and the cladding to improve the resistance to penetration of moisture and air into the building.

For example, a very common wall system for residential and light commercial construction consists of the following sequence of materials from inside to out:

Gypsum-board or paneling. This has no structural function but provides a decorative interior finish and contributes to air sealing.

Wood framing. Commonly built of 2"×4" or 2"×6" wood lumber, the framing provides the vertical strength to support the weight of the building. Window and door penetrations are framed in lumber and structural headers are installed to transmit the loads around these penetrations. Floor, ceiling and roof systems normally rest on the top of exterior wall sections and load-bearing interior walls.

Sheathing. A sheathing material is mechanically fixed to the exterior of the wood framing. Commonly used materials are plywood and oriented-strand board ("OSB"). The sheathing may serve several functions including an air barrier, bracing the wall system against racking forces and providing a nailing surface for the exterior cladding. Note that in some applications sheathing may be omitted providing that a bracing system is installed to resist racking forces.

Housewrap. An air/water barrier is usually applied over the sheathing. Commonly a non-woven polyolefin material is stapled to the sheathing but historically an asphalt-impregnated paper based material ("builders felt") was used for this purpose. The function of the air/water barrier is to reduce air infiltration into the building and to prevent moisture from cladding leaks (e.g. wind-driven rain) from entering the building.

Cladding. The cladding material is commonly installed by nailing the clapboard, shingle or other material to the sheathing. This practice also has the effect of creating numerous holes in the air/water barrier, thereby compromising its performance. It is a best practice, although rarely implemented, to leave a space between the cladding and the air/water barrier thereby creating a clear path for bulk water to drain down the face of the air/water barrier (creating a "drainage plane") and for air to circulate between the cladding and air/water barrier to dry out any moisture that may have penetrated the cladding.

The same principles are commonly employed in the roof system in residential and light-commercial construction. From interior to exterior the sequence is:

Gypsum-board. This is usually only installed when the underside of the roof is part of the living or occupied area (e.g. cathedral ceilings). It is rarely applied in unfinished space such as attics Wood framing. Since roof loads include a substantial lateral force component the dimensions are typically 2"×10" or 2"×12" to resist bending.

Sheathing. Similar sheathing materials are used as in the wall system

Air/water barrier. An asphalt-impregnated paper product ("builders felt" or "roofing felt") is commonly used for this purpose. Synthetic or bituminous membrane products may be used in more vulnerable areas such as near the eaves or in valleys where roof sections join.

Cladding. The most common cladding material is asphalt-impregnated fiberglass reinforced shingles. Other materials include natural and synthetic slate, tiles and sheet metal.

Until the 1970's it was quite common for buildings to be built with no insulation. Since then rising energy prices and the introduction of energy codes have resulted in universal improvements in the insulation of buildings although current code levels still fall short of what many building scientists recommend.

The commonest way to insulate residential and light-commercial buildings of the frame-and-cladding type has been to install insulation in the framing cavities bounded by the gypsum-board on the inside, the sheathing on the outside and framing members on the sides and top and bottom. Fiberglass batt insulation continues to be the predominant cavity insulation used in new construction but other materials including blown-in fiberglass or cellulose and spray foam insulation either alone or in combination with a fiberglass batt have seen increasing use, providing both greater thermal conductive resistance and improved air sealing to reduce energy losses through air infiltration. To increase the level of cavity insulation there has also been a shift in wall construction from 2"×4" framing to 2"×6" framing to increase the depth of the cavity and therefore the resistance to heat loss through the insulated cavity. Retrofitting cavity insulation in existing frame-and-cladding buildings is difficult and costly, the commonest method being to drill holes in either the interior gypsumboard or exterior sheathing in order to blow fiberglass or cellulose insulation into the framing cavities.

Although cavity insulation reduces the flow of heat through a building assembly such as a wall or roof it suffers from a major weakness—heat flow through the framing members. Framing members may represent from 10% to well over 50% of the surface area of a wall depending on the number, area and location of windows, doors and corners. For energy calculations an average wall is typically assumed to have 20-25% framing. The thermal conductivity of wood framing is over three times greater than common insulation materials such as fiberglass batts or cellulose and the framing members therefore create thermal bridges that account for at least 30% of the heat loss through a wall or roof assembly.

Several strategies have been developed to overcome this thermal bridging including double wall construction, structural insulated panels and exterior insulation systems.

In double wall construction a second wall is framed inside the exterior structural wall with a gap of from 1" to 6" between the walls. Whenever possible, the framing members of the second wall are offset from the first wall to minimize thermal bridging through the framing. The gap between the two walls and the cavities of both walls are completely filled with an insulating material such as blown in fiberglass or cellulose or spray foams. This strategy is quite effective although expensive due to the material and labor cost of installing the interior framed wall.

The second strategy that has been used is to build the framing walls and/or roof sections of Structural-Insulated Panels ("SIPs"). SIPs consist of a sheet of insulating foam sandwiched between and adhered to two skins or sheets of plywood or OSB. The resulting panels are dimensionally stable and may be used as structural members either alone or in combination with large-section timbers that create a primary frame to which the SIPs are fastened ("timberframe construction"). Other than the insulating foam, there is no connection between the interior and exterior skins so SIPs must be installed so that the stresses due to the weight of the interior finish (e.g. gypsum board) or the exterior cladding are transmitted to the foundations directly through the skin panels. Although SIPs provide effective insulation and air-sealing they have found limited acceptance due to their cost, installation difficulties and the difficulties of installing electrical outlets and other services without compromising the structural and thermal integrity of the panels. These limitations may necessitate installing a non-structural wall against the interior side of the panel with significant additional material and labor cost or providing surface mounted raceways for electrical circuits that compromise the finished appearance of the wall.

The third strategy that has been used is to install an exterior insulation system to insulate the entire building. The commonest system of exterior insulation is to cover the exterior of the framing system with rigid expanded-foam boards and a less common approach, used principally in retrofit applications, is to build a framework on the outside of the framing wall to hold either a blown-in or a spray foam insulation system.

Rigid expanded foam boards consist of a sheet of expanded foam that is either unfaced or may have a protective sheet of plastic, foil or other material adhered to one or both faces. In one commercially available system the foam sheet is adhered to a composite wood-based material that may be applied directly to the wood structural frame to serve the bracing function of the sheathing material in conventional construction ("Structural Insulated Sheathing"). The expanded foam board in all these applications is factory-manufactured and may be made of a variety of low-thermal conductivity materials but polystyrene, polyurethane and polyisocyanurate foams are widely used. The foam boards are applied to the exterior of the sheathing in one or more layers and may be secured to the sheathing by mechanical (nails, screws) and/or adhesive systems. Joints between boards may be caulked and/or taped to provide an air-tight enclosure.

Although rigid expanded foam boards potentially provide high thermal insulation and air-sealing the system has significant limitations, principally related to the application of cladding material to the exterior of the foam board. In some applications the cladding material is installed by nailing through the foam board and into the structural sheathing and framing members behind. This approach however can only be used with foam board up to a limited thickness depending on the weight of the cladding material, and for this reason 2" foam board is the maximum that vinyl siding manufacturers will allow while the manufacturers of fiber cement siding allow a maximum foam thickness of 1.5". Other drawbacks to this approach are the large number of small thermal bridges where highly conductive steel nails penetrate through the insulation and the sheathing into the framing and the large number of nail holes in the air/water barrier and insulation board that potentially compromise performance.

If rigid expanded foam board thicker than that permitted by the cladding manufacturer is to be applied to a building then it is necessary to apply furring strips to the face of the foam board on which the cladding may be installed. Such furring strips are typically strips of wood or plywood that are aligned vertically with the framing studs in the structural wall and then long screws are driven through furring strip, the insulation and the sheathing into the framing studs. Although effective this method of using thick layers of insulating board covered by furring strips is rarely used because of the high cost of the long screws required and the amount of skilled labor time required to correctly install the furring strips.

Another approach to exterior insulation is to install a structure on the exterior wall that will support the cladding and to which an insulating system is then applied. This method is rarely used in new construction due to its cost and complexity but is sometimes used to significantly increase wall insulation levels in existing construction. In one application of this method a series of I-beams consisting of wood flanges joined by a web of plywood or OSB are attached vertically to the sheathing coincident with the internal framing studs by screwing through one of the flanges thereby creating a series of cavities on the exterior of the building. Insulating spray foam, commonly polyurethane based, is sprayed into the cavities, typically to less than the full depth of the I-beam. The cladding is then applied to the exterior flange of the I-beam creating a cavity between the cladding and the insulation through which air can circulate to dry out any moisture that penetrates the cladding. In another application of this method the I-beams are installed as described and then plywood or other sheet material is applied to the exterior flange face and the upper and lower ends of the I-beams to create a series of closed cavities. Holes are then drilled in the exterior cavity faces and fiber glass or cellulose insulation is blown in to insulate the cavity. Cladding is then applied to the exterior sheet material. Both methods can be used to create thick walls with very high insulating values but are both materials and labor intensive and therefore costly.

In U.S. Pat. No. 6,279,293 B1 Ojala discloses an insulated roof panel in which sheathing material on either side of an insulated panel is secured to a plurality of web trusses comprising top cords, bottom cords and a plurality of webs joining the cords together. This assembly is intended only for roofs and the web trusses are supplied to carry compressive forces. Ojala's panels result in a heavy construction and have a high level of thermal bridging through the web trusses.

In U.S. Patent Application Publication 2006/0263575 A1 Ritchie discloses a method for reinforcing a foam panel using transverse strips of sheathing attached to sheets of material that comprise the two faces of the panel, the cavities between the two sheets being filled with foam. The reinforcement is intended to increase the rigidity of the panel and the intended use of the panels is roofing and flooring, not wall construction. Thermal bridging through the reinforcing strips remains a problem.

Accordingly there remains a need to provide an insulating structure which provides thermal insulation and resistance to air and moisture penetration, and can be made arbitrarily thick while still suitable for mounting of cladding materials without requiring thermal bridges that degrade thermal insulating capabilities.

SUMMARY OF THE INVENTION

Briefly, the present invention provides a system for insulating the walls and roofs of buildings using non-structural insulating panels attached to the exterior of the building's structural framework.

In one aspect, the invention is an insulating panel structure for application to the exterior of a building, the panel structure having an inner surface to be attached to the building and an outer surface to be attached to an external load such as cladding material. The panel structure has external stringers along the outer surface of the panel for attachment of the external load, connectors extending perpendicularly from the internal surface to the external stringers to transmit compressive forces from the external load to the building, lateral connectors that run diagonally upward from the external stringers to the inner surface to transmit tensile forces from the weight of the external load from the external stringers of the panel to the building, and insulating foam embedded in the space defined between the inner and outer surfaces.

In a preferred embodiment of the invention, the panel structure has horizontal internal stringers along the inner surface of the panel, the external stringers are vertical, the perpendicularly extending connectors are tubular and extend between the internal and external stringers, and the lateral connectors are shear transfer strips attached to the perpendicularly extending tubular connectors between the internal and external stringers. The lateral connectors and perpendicularly extending tubular connectors preferably are made from low thermal conductivity materials such as plastic or glass fibers, and are embedded in the insulating foam. Because the only elements bridging the basic panel are the low thermal conductivity perpendicular and lateral connectors and foam, the panel may obtain a high degree of thermal resistance.

The lateral connectors transfer shear forces from the exterior face of an insulating panel to the interior face. This enables the weight of exterior building loads, e.g., cladding materials or in some instances porch roof or deck loads, to be transferred to the interior building structure. The disclosed lateral and perpendicularly extending connectors provide minimal thermal bridging between the interior and exterior faces thereby maximizing the insulating value of the panel. The panel structure also greatly facilitates an airtight building enclosure thereby minimizing energy losses due to air infiltration.

In further aspects of a preferred embodiment, the insulating panel structure has door or window elements incorporated in the panel. Similarly, the insulating panel structure may incorporate gutter or leader elements.

In another aspect, the invention is a method of insulating a building structure using non-structural insulating panels of the type described above having exterior stringers, perpendicular and lateral connectors, and embedded foam. The method proceeds by measuring the size of a panel to be attached to the building structure, constructing the panel to size away from the building site, moving the constructed panel to the site of building structure to be insulated, fastening the panel to the exterior of the building structure, and applying exterior loads such as cladding to the panel's exterior stringers. In another embodiment, cladding material is applied to the panel when the panel is constructed, and the panel and cladding material are moved together to the building site for attachment to the building.

In another aspect, the invention is an apparatus and method for transporting an insulating foam panel having tubular connectors extending inwardly from the panel's outer surface, the tubular connectors having openings at the outer surface. The apparatus has expandable fingers insertable into the tubular connectors, and a movable frame holding the expandable fingers with a spacing corresponding to the spacing of the tubular connectors. To transport the panel, the expandable fingers are inserted into the tubular connectors of the panel, the fingers are expanded to grip the tubular connectors and panel, and the movable frame is then moved by, e.g., a telehandler type of transporter, to deliver the panel to its desired destination, e.g., from factory to truck bed, or from a truck bed to a location adjacent a building surface where the panel may then be attached to the building and the fingers contracted to release the panel and allow the movable frame to be retracted. In this way a large panel without heavy structural members may be securely moved without damage.

The system is designed to simplify the construction of highly energy-efficient residential and commercial buildings and is also well suited to retrofit installation on existing buildings. The panels desirably fit closely together, adjacent panels are sealed, and together form an insulated and air-tight "cocoon" around the building structure thereby producing a highly energy efficient building envelope.

The panels are well suited to manufacturing in a factory to the precise building dimensions and then transported to the job site for installation. The system will realize substantial efficiencies in labor and materials, improve quality control, reduce weather delays on projects and shorten construction time.

Although panels may be sized to be installed adjacent to separately installed window and door assemblies, these assemblies are preferably installed in the panels at the time of manufacture. This provides further economies in materials and labor as well as ensuring very tight air sealing around these envelope penetrations.

The system may also include an integrated rainwater management system that collects rainwater from the roof into concealed gutters from which it may be directed to a cistern, drywell or other dispersal area.

The panels and construction and transportation apparatus and methods are appropriate for both wall and roof insulation applications.

From the foregoing description it will be appreciated that the system of the present invention overcomes the limitations of the existing insulation systems described in the previous section. The described exterior insulation system is one that provides highly-insulating walls and roofs, minimizes thermal bridging, eliminates penetration of the air/moisture barrier by nails or screws, reduces the cost and amount of materials required and reduces the calendar and labor requirements.

The preferred embodiment of the insulating panel comprises a plurality of stringers on the internal face that are typically oriented horizontally and are joined by connectors to a plurality of stringers on the external face that are typically oriented vertically with the entire assembly being embedded in a rigid insulating foam matrix. The connectors between the internal and external stringers are of two types, perpendicular connectors that transmit compressive forces and lateral connectors that run diagonally downwards from the inside to the outside face and are designed to transmit the weight of an exterior load such as cladding from the exterior side of the panel to the internal side of the panel, eliminating deformation of the panel due to shear stresses caused by the weight of the exterior load attached to the exterior stringers.

The insulating system may be used on any building type in which a structural framework is covered by a weatherproof cladding material. It is well suited for residential, commercial, institutional and industrial buildings. It may be used to insulate above- and below-grade walls and roofs. It may be used in both new construction and in buildings that are being retrofitted to significantly reduce energy consumption.

The panel system may be deployed in several ways. One way is that standard manufactured panels are delivered to the construction site where they are cut to shape, installed on the structural framework of the building, openings for windows and doors are cut and framed, windows and doors are installed and flashed and cladding is applied to the exterior of the panels. In a preferred embodiment the structural framework is accurately measured and panels are then manufactured according to the building dimensions with framing for all window and door openings installed prior to installation of the foam insulation. The panels may be of any size although size will typically be governed by limitations of transportation and installation handling. Window and door assemblies may be installed in the factory prior to delivery or may be installed on-site after panel installation. The panels are shipped to the job-site, installed on a newly-built or existing structural framework and the weatherproof cladding is then installed.

These and other objects, advantages and features of the invention are set forth in the attached description.

DESCRIPTION OF THE DRAWINGS

FIG. 5 shows above and below-grade walls insulated with insulating panels according to the invention.

FIG. 6 shows a window installation integrated into an insulating panel according to the invention.

FIG. 7 shows a building eave having a continuous insulating envelope formed by the use of insulating panels according to the invention on the wall and roof.

FIG. 8 shows a gutter system integrated with an insulating roof panel and a drainage system for the collected water that it is integrated with the wall panel.

DETAILED DESCRIPTION OF THE INVENTION

Figure 1:
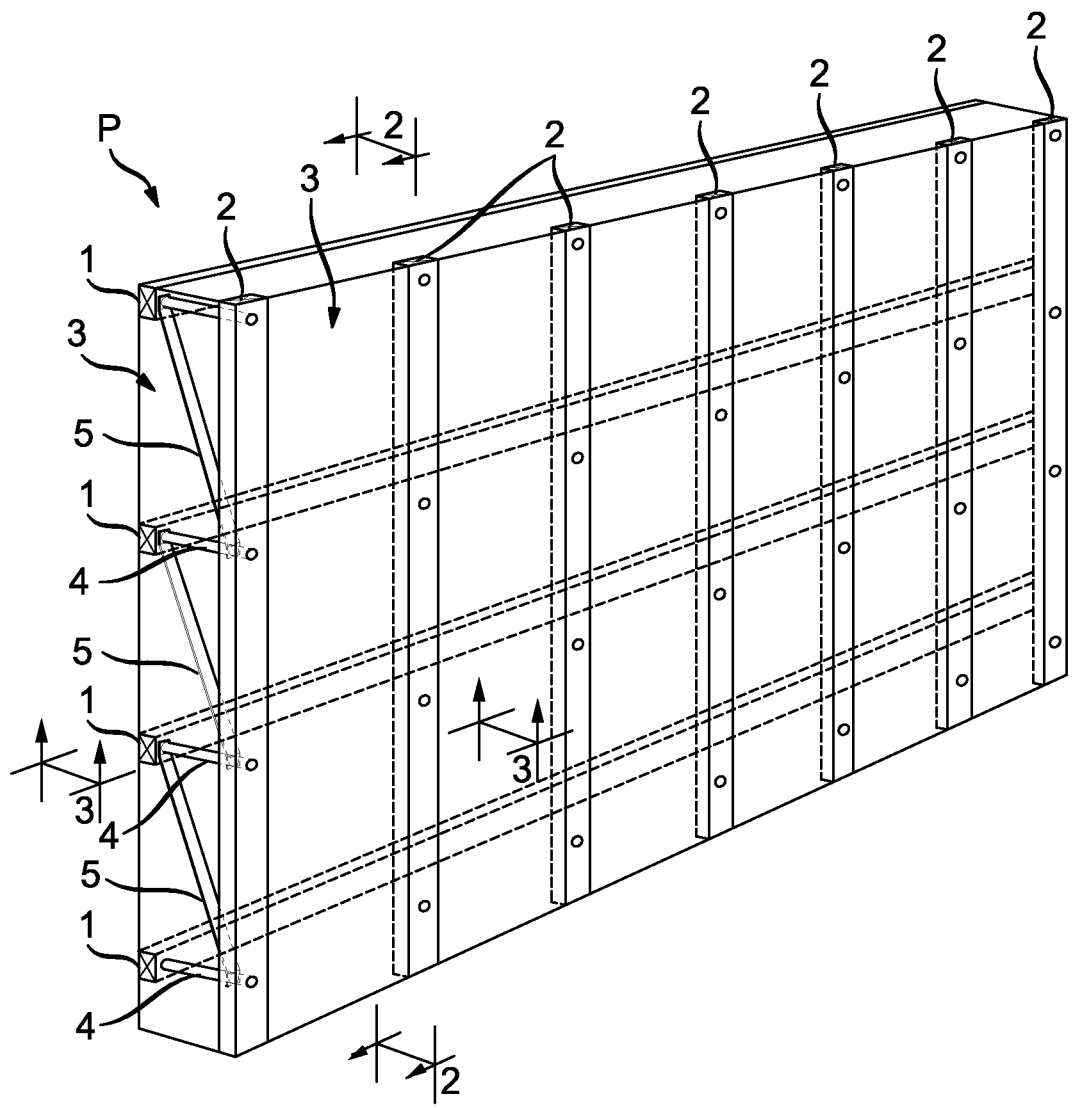
FIG. 1 is a perspective view showing the major components of an insulating panel according to the invention.

FIG. 1 is a perspective drawing showing the major components of an insulating panel P according to the invention. The panel P includes a plurality of horizontal stringers 1 at the interior of panel P (located adjacent a building structural wall, not shown) and a plurality of vertical stringers 2 at the exterior of panel P (located adjacent cladding material, not shown). The stringers 1 and 2 are embedded in insulating foam 3. The interior stringers 1 are connected to the exterior stringers 2 at multiple points using perpendicularly extending compression tube spacers 4 and laterally extending connectors or tension strips 5.

As will be explained below, the panel P is fastened to a building structural wall by means of and at the locations of the compression tubes 4. The laterally extending connectors or tension strips 5 connect the inner end of one compression tube 4 with the outer end of the compression tube in the row below. Accordingly, a compression tube 4, a lateral tension strip 5 and the building structure between the compression tubes to which a tension strip is connected together form a rigid load-bearing triangle that is able to transmit the weight of the panel and any exterior load, such as cladding, to the building structure and thereby support the panel and exterior load without sagging. The exterior load weight, pulling downward at the exterior of panel P, creates a compressive force in compression tubes 4 that pushes against the building, and a tensile force in tension strips 5 that pulls away from the building, and the building structure anchoring the tubes 4 and strips 5 counteracts these forces and thereby supports the weight of the panel and exterior load. Because tubes 4 and strips 5 may be constructed from materials with low thermal conductivity and the panel P is made from these components and stringers separated by insulating foam, the panel P advantageously combines high resistance to heat conduction, low weight and ample structural strength to support both the panel and exterior loads mounted at the exterior of the panel where their weight can form a significant shear force and bending moment.

In a wall insulating panel the interior stringers 1 would typically be oriented horizontally and the exterior stringers 2 would typically be oriented vertically as shown in FIG. 1. This combination of orientations provides some rigidity and strength to the panel P during handling and installation and also facilitates attachment of the interior stringers to the structural framing (as framing studs and rafters are vertical) and of the exterior cladding to the exterior stringers (most claddings are applied in horizontal rows). However the orientation of the stringers may be changed as required depending on the design of the interior framing and the exterior cladding. Additionally, for some applications the interior stringers may be replaced by sheets or strips, e.g., of plywood or OSB, or may be eliminated altogether if the structural support provided by the interior stringers is not needed. Sheet materials such as plywood or OSB may also be used in place of the stringers on the exterior side of the panel P.

The stringers 1 and 2 shown in FIG. 1 are typically rectangular or square in cross section, may be solid or tubular and may be manufactured from any material with adequate strength for the application. Suitable materials include vinyl and other plastics, glass-fiber reinforced composites and wood. Although metals can be used their high thermal conductivity will increase the conductivity of the panel and reduce its thermal performance.

Figure 2:
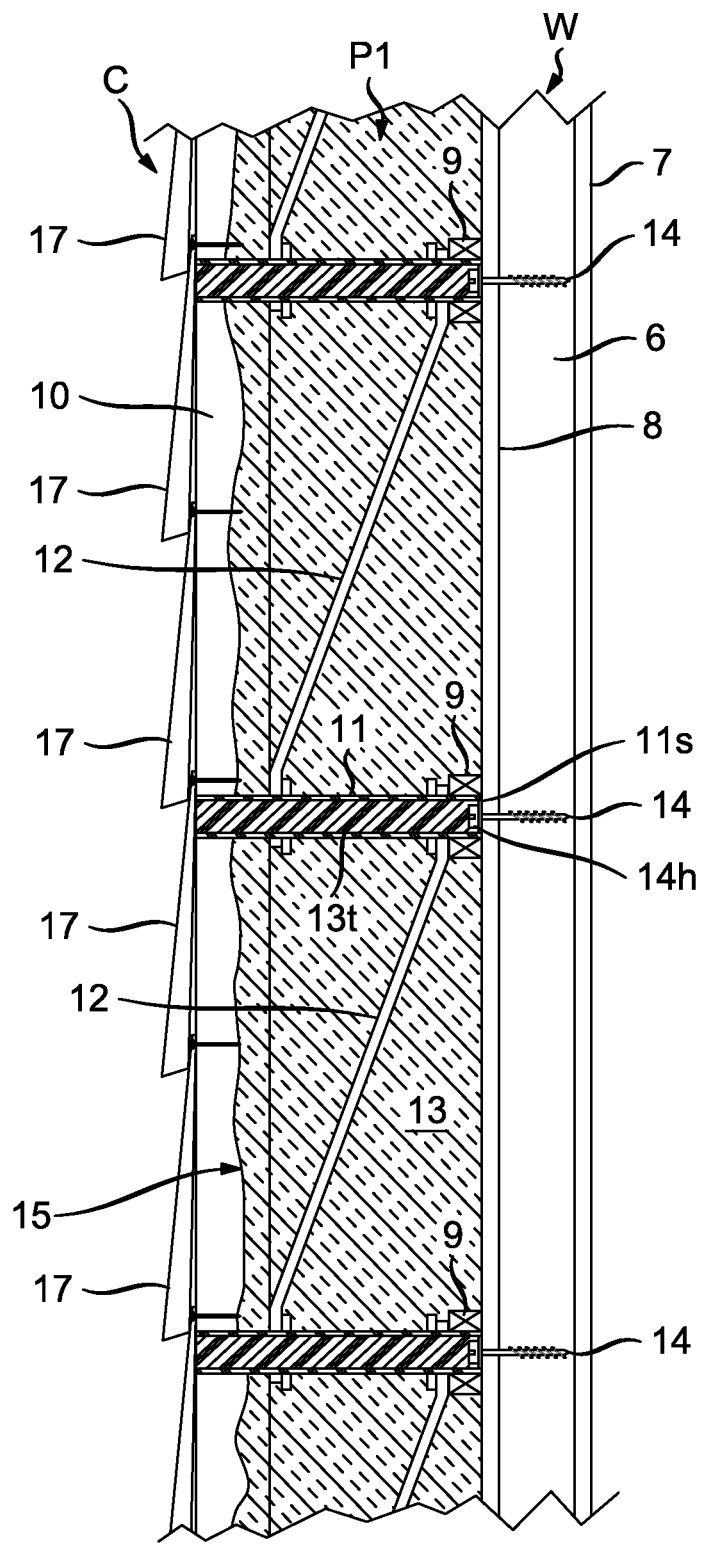
FIG. 2 is a vertical cross section along line 2-2 through the panel of FIG. 1.
Figure 3:
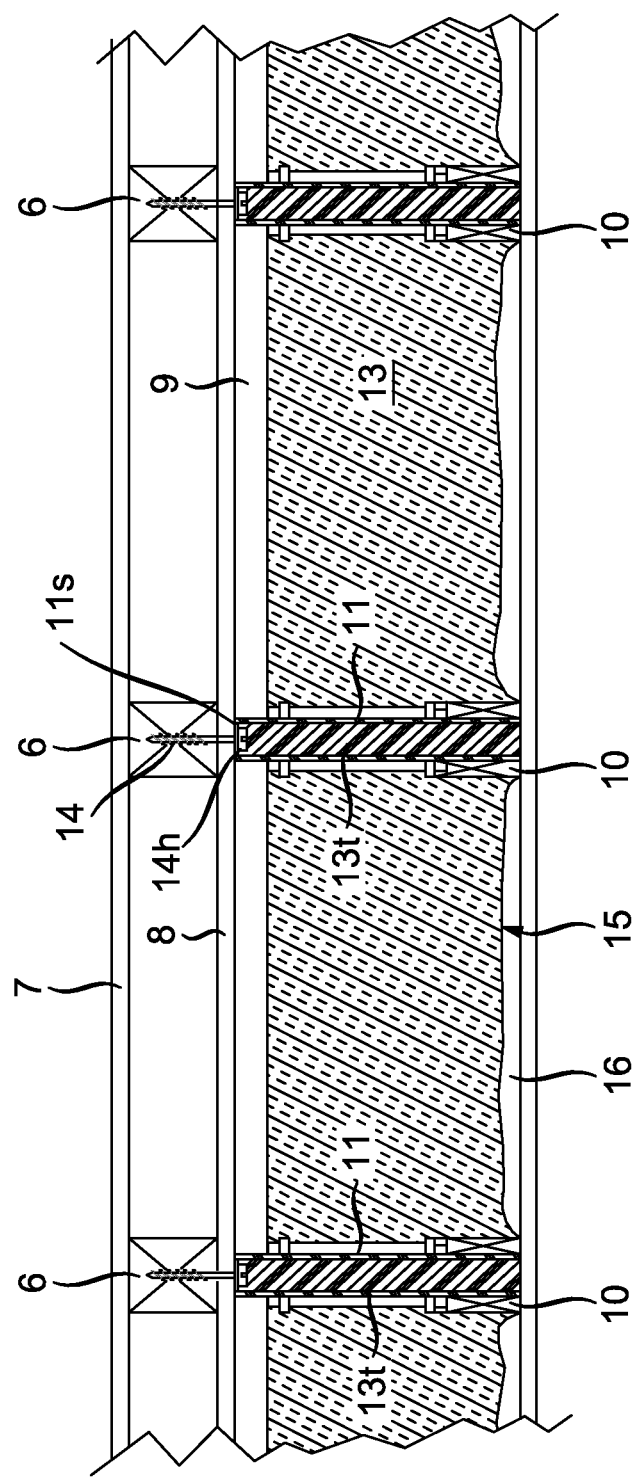
FIG. 3 is a horizontal cross section along line 3-3 through the panel of FIG. 1.

FIGS. 2 and 3 show respectively a vertical and a horizontal section through a typical wall section, and show in greater detail the structure of an insulating panel P1 and its attachment to a typical building wall W. The same label numbers are used on the two drawings to assist in identifying the components.

The wall W of FIGS. 2 and 3 is shown framed with 2"×4" nominal dimension lumber 6. This is common in residential construction but the panels P1 can be installed on any suitable structural frame.

The building structure shown in FIGS. 2 and 3 from inside to outside has three major parts, structural wall W, insulating panel P1, and an exterior load provided by cladding layer C.

The structural wall W is comprised of interior gypsum board 7 attached to the studs 6 and other framing members such as plates and headers (not shown), and an exterior layer of sheathing 8 of plywood, OSB or other material. The sheathing 8 serves two purposes: it braces the wall against racking and shearing forces and acts as an air barrier. In wall construction according to the invention, adjacent insulating panels P1 are sealed together at their edges and so provide excellent air sealing of the envelope, and thus the usual sealing function of sheathing 8 is unnecessary. Thus when insulating panels P1 are used, sheathing 8 may be eliminated and the bracing function of sheathing 8 may be performed by diagonal strapping of metal, wood or plastics secured to the outside of the framing members, a significant cost saving.

Figure 4:
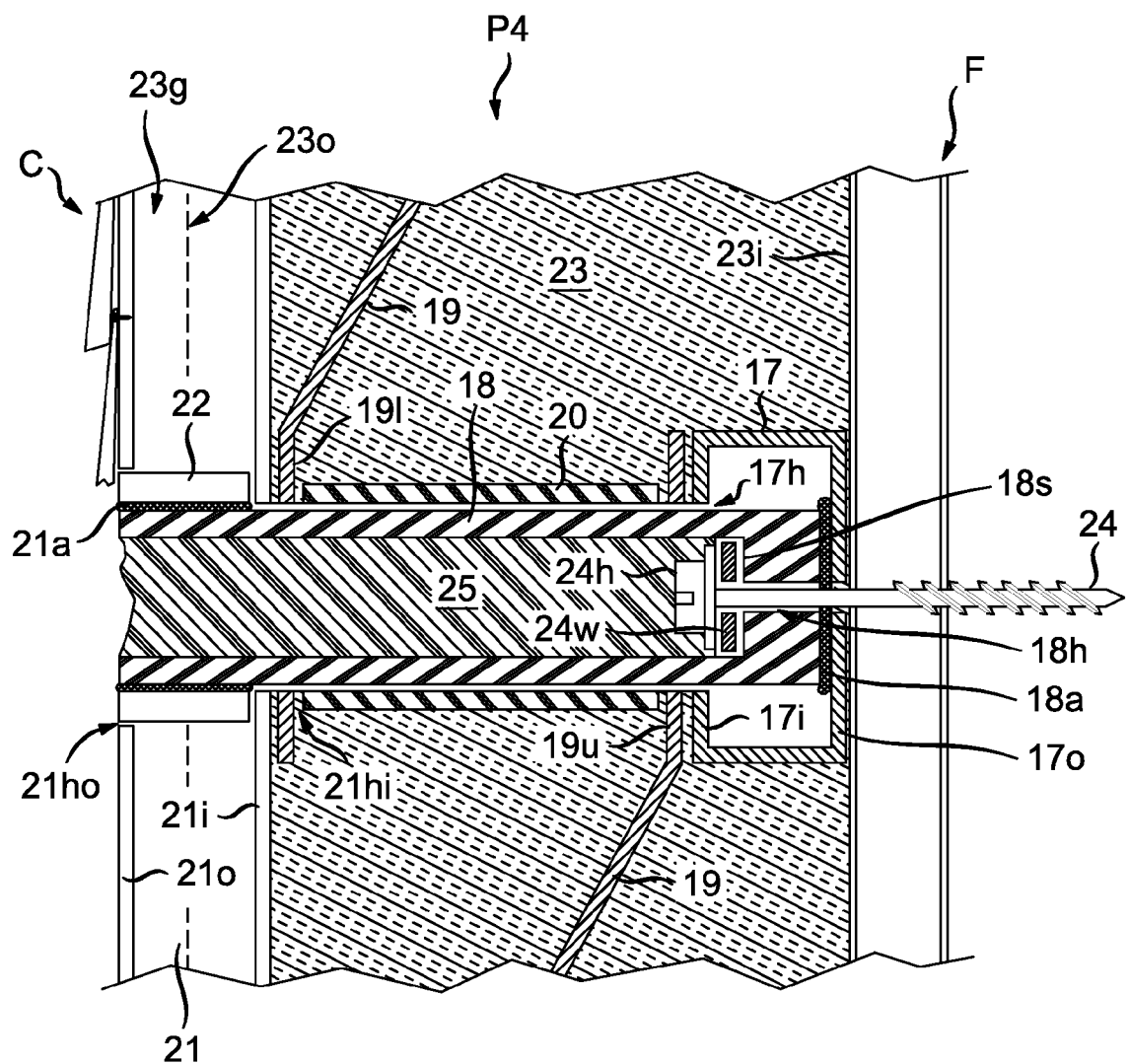
FIG. 4 is a detailed view showing the connection of perpendicular and lateral connectors of the panel, and the connection of the panel to the structural framing.

The insulating panel P1 has a frame or skeleton of interior horizontal stringers 9 that are connected to the exterior vertical stringers 10 by perpendicularly extending hollow connecting tubes 11 and by laterally extending shear transfer strips 12. All of these components are embedded in a matrix of insulating foam 13 to form a rectangular solid shape. The panel P1 is fastened to the structural wall W by fasteners such as lag bolts or screws 14 that are installed in the hollow connecting tubes 11 and are screwed into studs 6. Typically, the connecting tubes 11 are formed with an inner shoulder $11s$ and the heads $14h$ of lag bolts or screws 14 seat against the shoulders $11s$ to secure the connecting tubes, and the attached stringers 9 and 10 and shear transfer strips 12, to the studs 6 in wall W. After installation the connecting tube 11 is filled with foam $13t$ to seal and insulate its hollow core. Detail of one design of the connecting tubes 11 is shown in FIG. 4, to be described further below.

The surface of the insulating foam 13 preferably has an impervious skin forming an outer surface 15 that acts as a drainage plane. If wind driven rain or other liquid water penetrates through gaps in the cladding layer C then it may drain freely down the surface of the insulating foam 13. Moreover, the surface of the insulating foam preferably is not flush with the exterior face of the vertical stringers but is recessed to provide an air gap 16 between the cladding layer C and the insulating foam surface 15. This air gap 16 allows for drying of any moisture that penetrates the cladding, thereby extending the life of wood cladding materials and also allows convection currents to form when the cladding is heated by strong solar radiation thereby cooling the surface of the insulating foam.

The cladding layer C loading the exterior of the panel may be of any type in normal use. Horizontal siding materials 17 like wood, fiber-cement or vinyl clapboards may be easily installed on the vertical exterior stringers 10 while vertical siding materials (e.g. board and batten) and traditional wood shingles may be installed by first installing either a sheet material (not shown) such as plywood or by installing horizontal battens over the vertical stringers 10 to provide a nailing surface.

The ability to transfer vertically oriented exterior loads from the insulating panel to the wall framing on the interior side may also be advantageously used to carry exterior structural loads in addition to cladding, such as porch roofs and decks. In such applications a horizontal ledger board is fastened to the vertical exterior stringers 10, joist hangers are fastened to the ledger board and roof or deck joists are fastened to the joist hangers. Provided the panel's load carrying perpendicular and lateral connectors are appropriately sized to carry such exterior loads, this design allows porch roofs, decks and other structures to be strongly fastened to buildings while retaining a full level of insulation between the ledger and the building interior.

FIG. 4 shows a detail of one method for connecting the interior and exterior faces of an insulating panel P4 according to the invention and attaching the panel to a building frame member F. As shown in FIG. 4, the interior stringer 17 is a hollow rectangular tube, and the perpendicular connecting tube 18 is a hollow cylindrical tube.

A hole $17h$ equal to the diameter of the connecting tube 18 is drilled through the inside face $17i$ of the horizontal interior stringer 17 and the connecting tube 18 is inserted in the hole $17h$ and bonded with adhesive $18a$ to the outside face $17o$ of horizontal stringer 17. The connecting tube 18 is typically an injection molded plastic component, in form like a solid rod that has been drilled out axially for most of its length, leaving a shoulder $18s$ at the inner end of the tube. A smaller diameter hole $18h$ extends through the center of the remaining rod section to locate the bolt or screw fastener 24 used to fasten the panel to the building frame structure F. The head $24h$ or washer $24w$ of the bolt 24 seats against the shoulder $18s$ of connecting tube 18.

The diagonally extending connector or stress-transfer strip 19 is designed to transfer the weight of the exterior load (cladding material C) from the outside vertical stringer 21 to an internal attachment point that is fastened directly or indirectly to the structural building frame F. The material composition and dimensions of the stress transfer strip 19 are selected so that the strip will not elongate due to stress or creep based on the weight of the cladding, windows and other loading components that may be attached to the exterior stringers 21. In a preferred embodiment the stress transfer strip 19 is comprised of a continuous loop of glass fiber filaments bonded together and encircling an upper collar $19u$ at its upper end and a lower collar 19*l* at its lower end. As shown in FIG. 4, the upper collar 19*u* at the interior end of the stress transfer strip 19 is inserted over the connecting tube 18, a spacer tube 20 with an internal diameter slightly greater than the outer diameter of the connecting tube 18 is slipped over the connecting tube 18 and the lower collar 19*l* at exterior end of the adjacent stress-transfer strip 19 above the connecting point is passed over the connecting tube 18. The vertical exterior stringer 21, also shown in the form of a rectangular tube, has holes 21*hi* and 21*ho* drilled in its inside and outside faces 21*i* and 21*o* respectively. The hole 21*hi* on the interior face is of equal diameter to the outer diameter of connecting tube 18 while the hole 21*ho* on the exterior face is on the same axis as hole 21*hi* but has a diameter equal to the outside diameter of a retaining collar 22, a cylindrical tube which may be of the same type and diameter as the spacer tube 20. The vertical exterior stringer 21 is held in place by the retaining collar (22) that is bonded with adhesive 21*a* to the connecting tube 18. It will be appreciated that while FIG. 4 illustrates but one connection point between interior stringers 17 and exterior stringers 21, there will be multiple connection points in a typical panel P4. In a typical panel construction, there will be a perpendicular connection point at each perpendicular intersection of the interior and exterior stringers, and a lateral connection point between each exterior stringer 21 and the interior stringer 17 in the row above. For certain applications where the spacing of interior and/or exterior stringers may have special requirements, it may be desirable to space the connection points further apart and not have a connection point at each stringer intersection, and it may be desirable to have the lateral connectors or stress transfer strips 19 extend across two or more rows of interior stringers 17.

After the panel skeleton is assembled from interior stringers 17, exterior stringers 21, and the perpendicular and lateral connectors 18 and 19 attached to the stringers by collars 19*c*, spacer tube 20, retaining collar 22 and adhesive 18*a* and 21*a*, a foam insulation material 23 is applied to fill the inner space of the assembled panel skeleton. Typically a form (not shown) would be used to contain the foam at the outer edges of the panel to form perpendicular outer panel surfaces able to closely abut adjacent panels assembled on a building frame F without air spaces. In a preferred embodiment the foam material 23 is a sprayed two-part polyurethane closed cell foam but other foam materials and application systems known in the art may also be used. The thickness of the panel P4 may be tailored for different applications but as an illustrative example, common thicknesses could be 3.5", 5" and 6.5" that will yield corresponding "R-value" insulation levels of approximately R20, R30 and R40 if closed-cell polyurethane foam is used for foam 23. In a preferred embodiment the foam material 23 is applied so that its inner surface 23*i* is flush with the interior face of the panel and its exterior surface 23*o* is ½" to 1" from the exterior face of the panel, leaving an air gap 23*g* for drainage or convection air flow as described previously. Typically the panel skeleton would be positioned horizontally during application of foam material 23 so that gravity would assist in filling the interior spaces of the skeleton with foam insulation.

To install the panel P4 it is placed against the structural frame F of the building and held in position. A drill bit is inserted into both the connecting tube 18 and hole 18*h*, and a pilot hole for the fastener 24 is drilled into the frame F, e.g., into a stud in the frame. The fastener 24 is then inserted into the connecting tube 18 and driven into the structural framing. If the structural frame is of wood then a lag bolt or screw would be used as the fastener 24. If the structure is of metal then a bolt and internal nut may be used while powder actuated fasteners can be used with concrete and masonry structures. Once the panel P4 is fastened to building structural frame F the hollow core of the connecting tube 18 is filled with spray foam 25 that is trimmed flush with the face of the exterior stringers.

Figure 5:
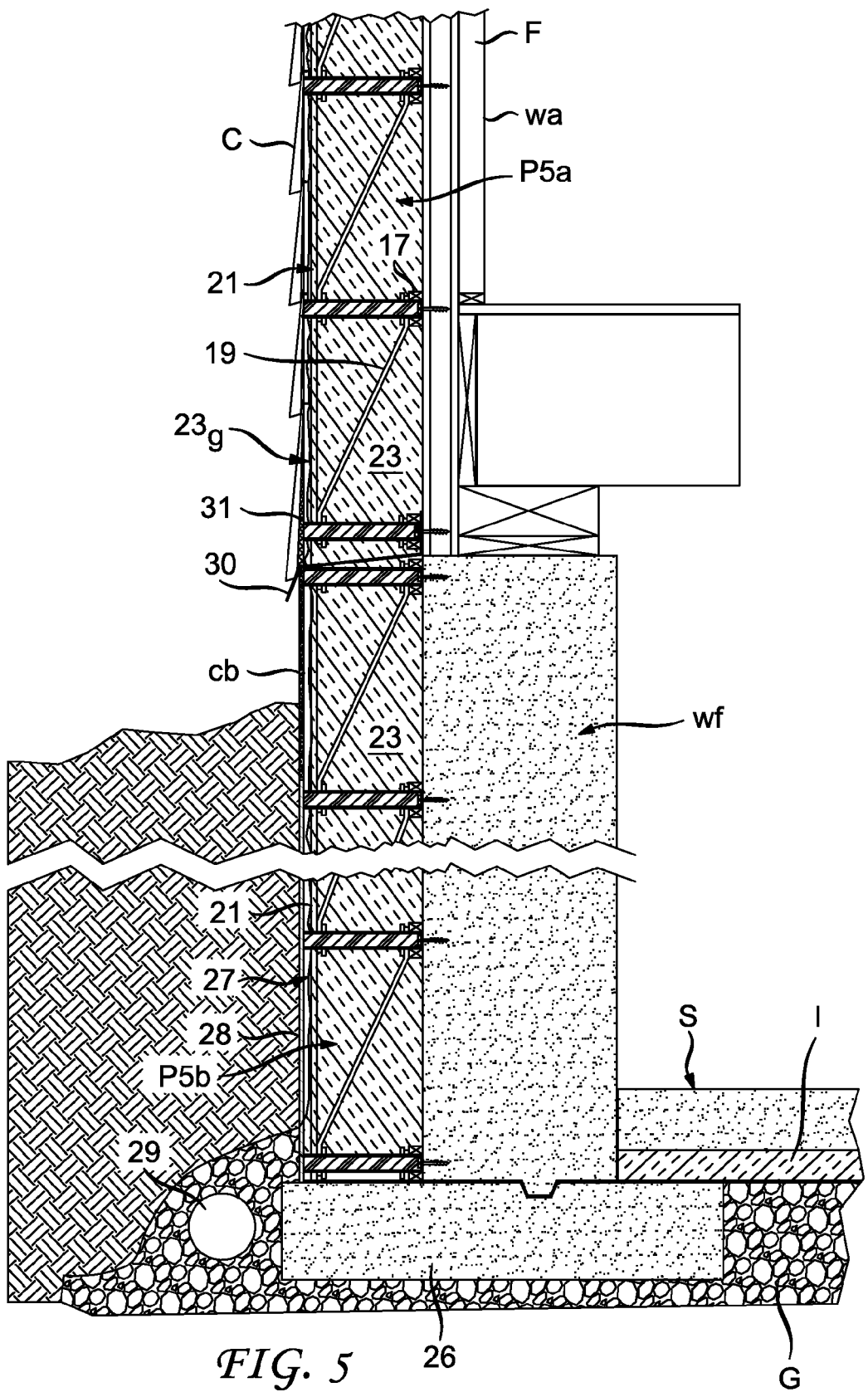
FIGS. 5, 6, 7 and 8 show the use of insulating panels according to the invention in building wall applications.

FIG. 5 shows the application of insulating panel P5*a* and P5*b* according to the invention to above and below grade walls. As shown in FIG. 5, insulating panel P5*a* is applied to an above grade wall Wa and insulating panel P5*b* is applied to a below grade or foundation wall Wf thereby creating a conditioned basement. The above grade panel P5*a* is fastened to the building frame F as described above with reference to FIG. 4, and has an exterior cladding load C, such as siding, attached to the exterior stringers 21.

As is typical, the foundation wall Wf rests on a footing 26 and joins a slab floor S poured over layers of insulation I and gravel G. The bottom of below grade panel P5*b* rests on the footing 26 and is attached to foundation wall Wf with explosive masonry fasteners, for example. The insulation between the vertical exterior stringers 21 from the bottom to the top of the panel P5*b* is covered with a drainage material 27. This would typically fit in a gap similar to the air gap 23*g* described above, which will provide a space where water can drain down to the footing drains. The drainage material is porous to allow free drainage down the face of the panel and may be of various materials commonly used as foundation drainage systems such as bonded glass or mineral wool fibers, dimpled plastic sheet materials or recycled materials such as ground up tires or soda bottles. The drainage layer may be covered by a geotextile material 28 to prevent sand and silt particles from blocking the drainage over time. The part of the panel P5*b* below grade level is in contact with earth or other filler. The part of the panel extending above grade level is covered with a suitable cladding material Cb such as cement board to provide durability, protection and aesthetics.

The wall construction shown in FIG. 5 allows free drainage down the face of the below grade insulating panel P5*b* to footing drains 29 and provides a hydrostatic pressure break that greatly reduces the possibility of water intrusion to the basement.

At the top of the panel P5*b* a termite shield 30 is installed and caulked to the structural wall. This also acts as a flashing at the bottom of the next panel P5*a*. An insect barrier 31 is typically installed at the bottom of the first above grade panel to prevent insects from entering the air space 23*g* between the exterior face of the insulating foam 23 and the back of the cladding C.

Figure 6:
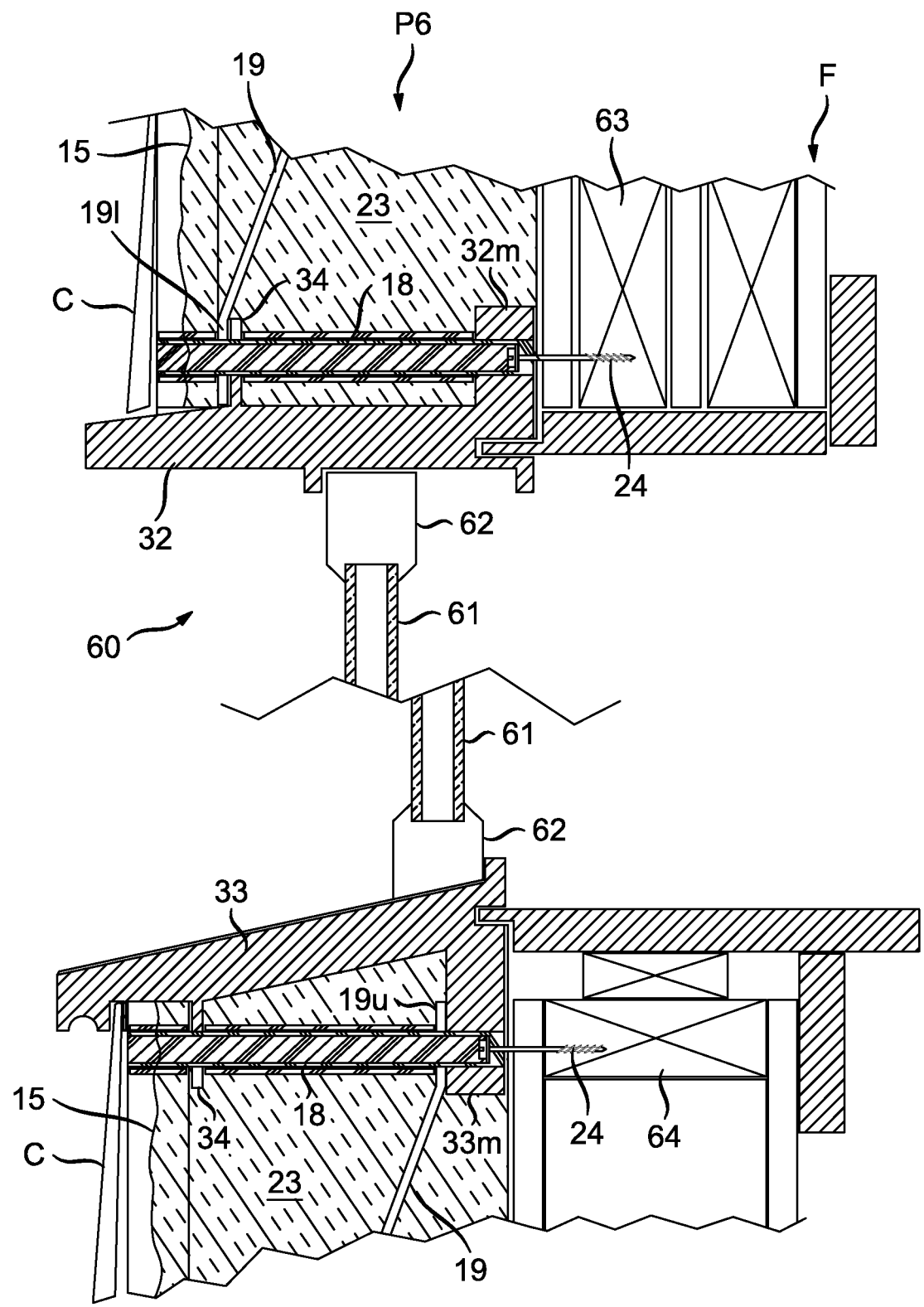

FIG. 6 shows how a building opening unit 60, e.g., a door or window, may be installed in an insulating panel P6 according to the invention at the time that the panel is manufactured. The ability to incorporate such opening units into an insulating panel offers great benefits in both insulating performance and in construction economics. The performance benefit comes because the opening unit 60 is now an integral part of the insulation and air barrier forming the building's thermal envelope. Also the opening's frames, e.g., window and door frames, are well flashed to the panel's drainage plane (such as that formed by foam surface 15 described above with reference to FIGS. 2 and 3), eliminating the possibility of water intrusion. The economic benefit comes from savings in materials and labor. As the window or door frame is now integrated with the panel structure it can be made less robustly as it does not have to withstand separate handling in transit and on the jobsite. The labor required to install a window or door frame during panel manufacturing is also far less than that required to install and weather-strip a window on the jobsite.

As is shown in FIG. 6 the building opening 60 is illustratively a window 61 with a frame 62. Window frame 62 consists of a top jamb 32 and a bottom jamb 33. There are also two side jambs of similar construction (not shown). The inner profiles of the jambs depends on the type of window (double hung, casement, fixed, awning etc.) and a double hung window is illustrated here. The outside profile of the jambs that attaches to panel P6 is similar for and applicable to side, top and bottom jambs of all window types.

On the interior side of the panel P6 all four jambs (top, bottom and sides) have mounting sections 32m, 33m that have the same dimensions as the interior stringers 17 and can be drilled for attachment to connecting tubes 18 just like the stringers 17. Towards the outer edge of the jambs 32, 33 a flange 34 is positioned just inside of the exterior vertical stringers 21. Connecting tubes 18 pass through the vertical stringers 21, the collars 19u and 19l of the lateral connectors or stress-transfer strips 19, the jamb flanges 34, and the jamb mounting sections and are fastened, e.g., with lag bolts or screws, to the header framing 63 at the top of the window, the king studs at the side of the window (not shown) and the sill 64 at the bottom of the window. The inner edge of each jamb is now mechanically fastened (using fasteners 24) to the structural framing F while the weight of the window frame 62 on the exterior side is transferred to the inner structure and building frame through the tubes 18 and stress transfer strips 19. Once the panel P6 is filled with foam 23 around the jambs the window will be completely and strongly supported.

Figure 7:
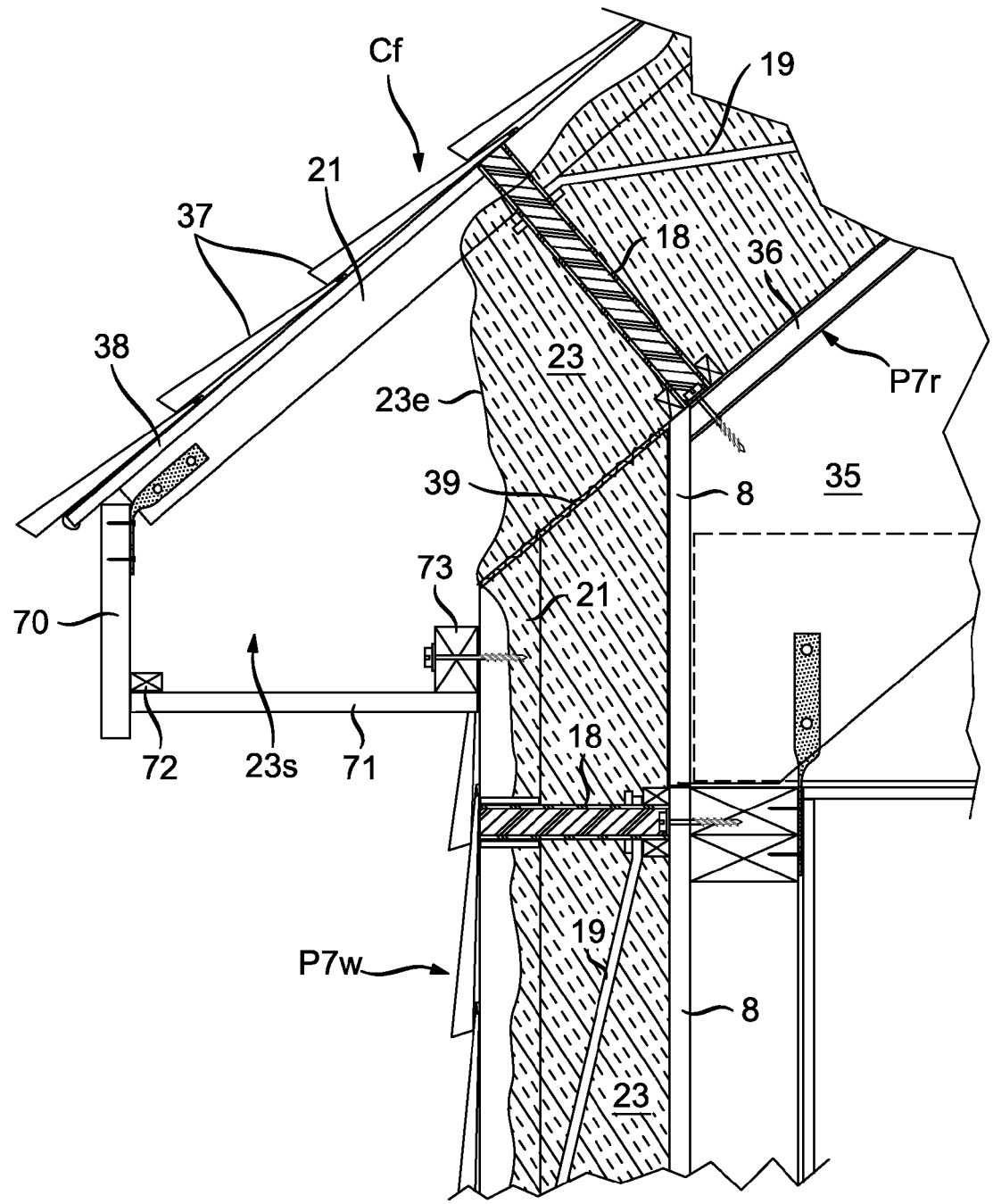

FIG. 7 shows how insulating panels P7w and P7r according to the invention can be used to insulate both walls and roof of a building. FIG. 7 is a vertical section at the joint of an insulating wall panel P7w and an insulating roof panel P7r. As is shown the two panels form a continuous thermal and air barrier around the outside of the building's thermal envelope.

To advantageously install adjoining panels P7w and P7r, the outer ends of roof rafters 35 and roof sheathing 36 must be flush with the wall sheathing 8. This can be done easily in new construction but for existing buildings the rafters and roof sheathing will usually have to be trimmed.

The top edge profile of the top wall panel P7w is beveled in manufacturing to match the pitch of the roof. The panel P7w is installed so that its top beveled edge is flush with (i.e., is coplanar with) the upper surface of roof sheathing 36. Roof panels P7r are essentially the same as wall panels P7w except that the foam filling 23 has an outer edge 23e that does not fill the overhang beyond the exterior surface of the wall panel P7w but leaves an open air space 23s. The joint between the wall panel P7w and the roof panel P7r is sealed with a suitable air-tight barrier material 39 such as spray foam or caulk or a gasket of closed-cell flexible foam. The roof cladding Cf is commonly asphalt shingles 37 installed over plywood sheathing 38 fastened to the exterior vertical stringers 21. Other roofing material may be used subject to appropriate dimensioning of the outer stringers 21, connecting tubes 18 and shear transfer strips 19. By attaching horizontal battens (not shown) over the vertical stringers 21 the roof panels P7r are well suited to roof claddings that require venting underneath such as cedar shingles or slate.

The fascia board 70 may be fastened to the end of the exterior stringers 21 at its top while its bottom is fastened to a soffit 71 that is also fastened to the wall panel P7w through the use of attachment blocks or strips 72 and 73 secured respectively to the fascia board 70 and vertical stringers 21 of wall panel P7w.

Figure 8:
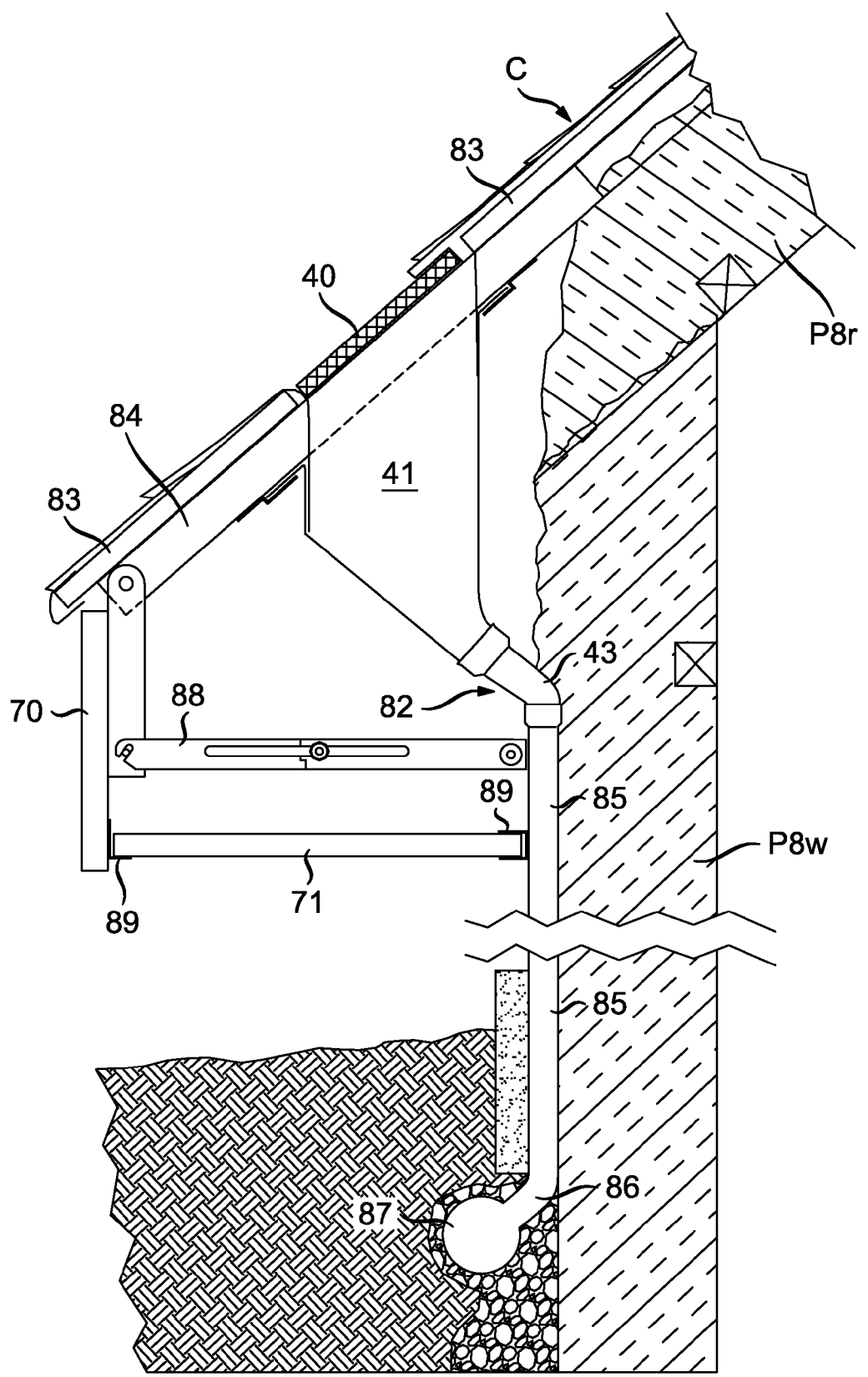

FIG. 8 shows an alternative detail for the edge of the roof that incorporates a concealed gutter 41 and downspout 82. In this embodiment a grating 40 is installed in the roof sheathing 83 above the eaves and a gutter 41 is mounted underneath. The grating 40 prevents leaves and other debris from entering the gutter although desirably it may be easily removed if necessary for cleaning. The gutter 41 is appropriately flashed to the roof cladding C and the exterior stringer 84 of insulating roof panel P8r to ensure all water is conveyed into the gutter 41. Fascia 70 and soffit 71 are attached with adjustable bracket 88 and clips 89.

Drainpipes 85 are installed in the wall panels P8w between the vertical exterior wall stringers during the manufacturing process with their outside faces flush with the outside face of the stringers. Preferably the drainpipes are thinner and wider than conventional drainpipes to minimize the loss of insulation at their location. The number and size of drainpipes 85 would be designed to accommodate the maximum flow expected in a heavy rainstorm for the roof area being served.

The drainpipes 85 are connected to the gutters 41 by appropriately located gutter connectors 43. The bottom of the drainpipes may drain to daylight above grade as a traditional drainpipe but the preferred embodiment shown in FIG. 8 is to terminate the drainpipes below grade through connectors 86 into a drain system 87 attached to the exterior stringers. The drains are sized to accommodate peak flow and pitched to drain to daylight, a watercourse, a drywell or a cistern. If an appropriately sized cistern is used the collected rainwater may be used for irrigation.

The gutter system shown in FIG. 8 has multiple advantages over traditional gutter systems. The aesthetic advantage is obvious as eave mounted gutters connected to externally mounted drainpipes are unsightly and prone to damage. The only visible part of the drainage system of FIG. 8 is the grating 40 set into the roof cladding. A second benefit is that the gratings greatly reduce the possibility of the gutter being clogged by leaves and other debris, a common occurrence that leads to overflows and building damage. A third benefit is that downspouts 85 can be located entirely for functional rather than aesthetic considerations to ensure adequate drainage capacity. For example two or more downspouts can be located to serve a valley where two roof sections meet, an area where many conventional gutter systems overflow due to insufficient drainpipe capacity. A fourth benefit is that by capturing all drainpipe flows in a common high-capacity drainage system that can be directed away from the building many potential basement moisture problems can be avoided, thereby creating a more durable and healthy home.

Figure 9:
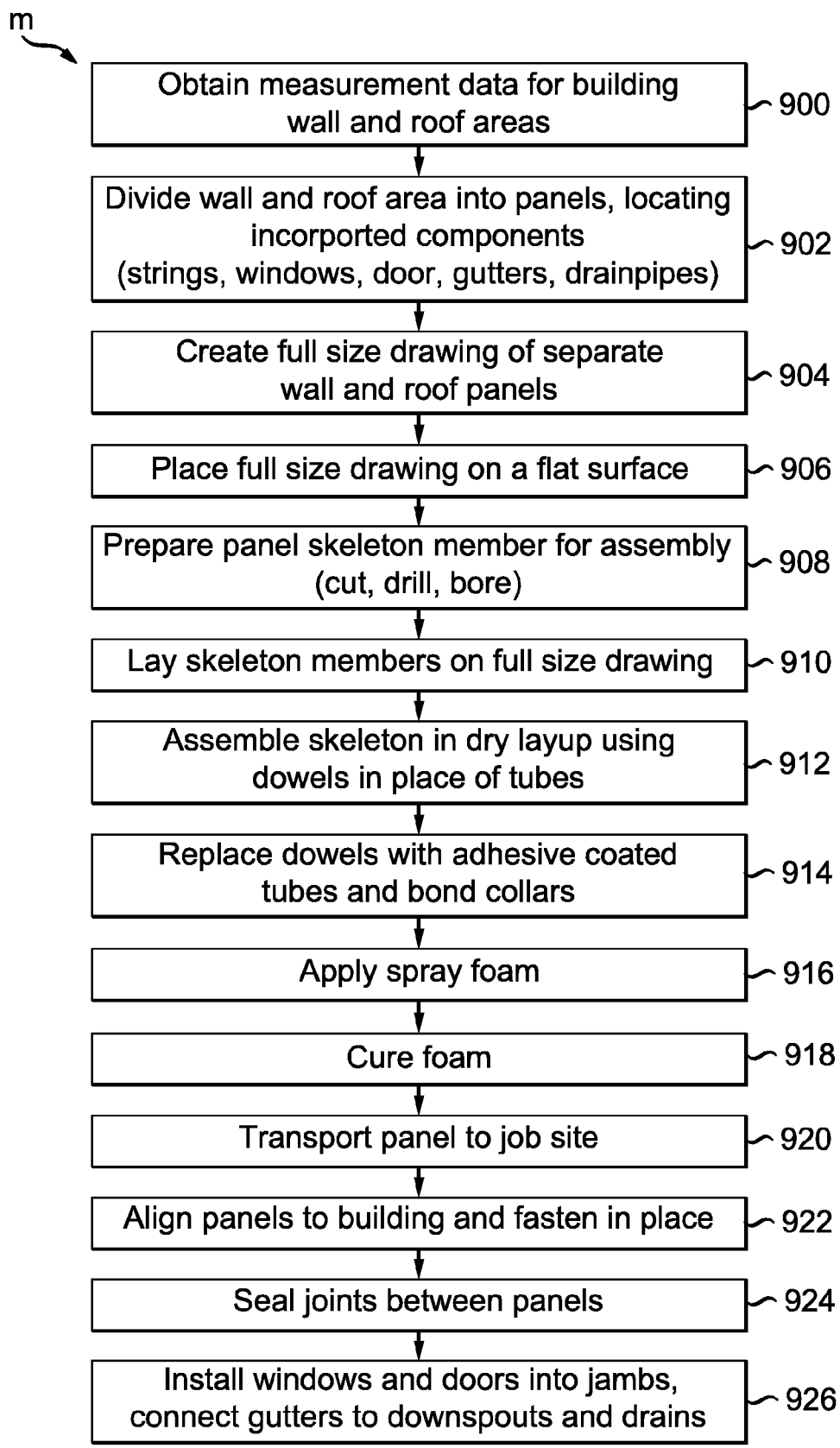
FIG. 9 is a diagram showing a method of manufacturing and installing insulating panels.

A preferred method M for the manufacturing and installation of insulating panels according to the invention such as have been described with reference to FIGS. 1-8 is shown in the diagram of FIG. 9.

In step 900 of method M, precise measurement data on the building wall and roof areas are created in a computer-aided design (CAD) system. In new construction this may be obtained from architectural drawings but would be verified. In existing construction this is obtained from precise measurement of the building after existing cladding (roof shingles, wall siding), window frames and door frames have been removed.

In step 902, the wall and roof areas are divided into multiple panels. The panels may be of any size but transportation and handling issues might limit a maximum size to approximately 30'×10'. The location of each stringer, window, door, drainpipe, gutter etc. is added to the drawing.

In step 904, a full-size drawing of the wall or roof panel is drawn or plotted on a suitable substrate. Suitable materials include paper based products such as kraft paper and paper equivalents such as nonwoven bonded materials.

In step 906, the drawing is laid out on a flat surface such as a floor or platform.

In step 908, the panel skeleton members are prepared for assembly. Accordingly, all stringers are cut to length. Holes are bored in the stringers and in the flanges of door and window frames according to the plans. The correct number and size of connecting tubes, spacer tubes, retaining collars and stress-transfer strips for each panel are prepared.

In step 910, the interior stringers and window and door frames are laid out on the plans. They may optionally be held in place on the substrate by adhesives or adhesive tapes.

In step 912, the panel skeleton is assembled in a dry layup. In the initial assembly dowel pins equal in diameter but several inches longer than the connecting tubes are used in place of the connecting tubes.

Once the dry layup is completed the panel skeleton is braced and clamped and all dimensions are verified against the plan.

In step 914, in turn, each dowel pin is removed and replaced by a connecting tube that has been coated with adhesive and a retaining collar is bonded in place.

In step 916, spray foam is installed into the interstices of the panel skeleton, leaving an outer air or drainage gap such as previously described gap 23g if desired. Foam application is preferably done in several passes so that heat from the exothermic reaction of the foam components can be dissipated. The spraying may be done manually but preferably robotic arms are used to dispense precisely metered quantities of foam material on the panel.

In step 918 the completed panel is allowed to cure until the spray foam has acquired sufficient rigidity to withstand movement.

In step 920, the panels are transported to the job site.

In step 922, each panel is aligned to the building and fastened to the structural frame. Typically installation will begin with the bottom wall panels and work upwards to the roof. Roof panels will typically be installed from the eaves to the ridge.

In step 924, all joints between insulating panels are fully sealed with caulk, foam or gasket materials.

In step 926, window sashes and doors are installed into the jambs incorporated into the panels, and the gutter system, if installed, is connected to leaders and drains.

FIGS. 10A, 10B, 11 and 12 illustrate an apparatus T for transporting insulating panels according to the invention. Typically, insulating panels according to the invention are relatively light (typically 1.5 to 2 lbs/sf) but lack rigidity. It is important in moving and installing the panels to ensure that force is evenly applied across the area of the panel to avoid strains that could either damage the panel or result in deformation that would compromise the fit and air-sealing of the building envelope.

Figure 10A:
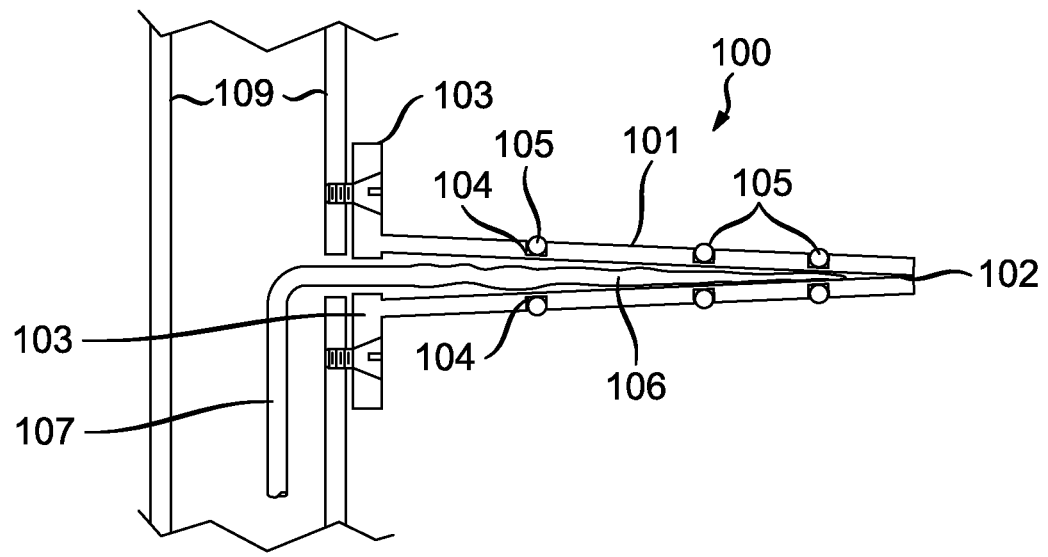
FIGS. 10A and 10B show an expansible finger used to grip an insulating panel at multiple points according to the invention.
Figure 10B:
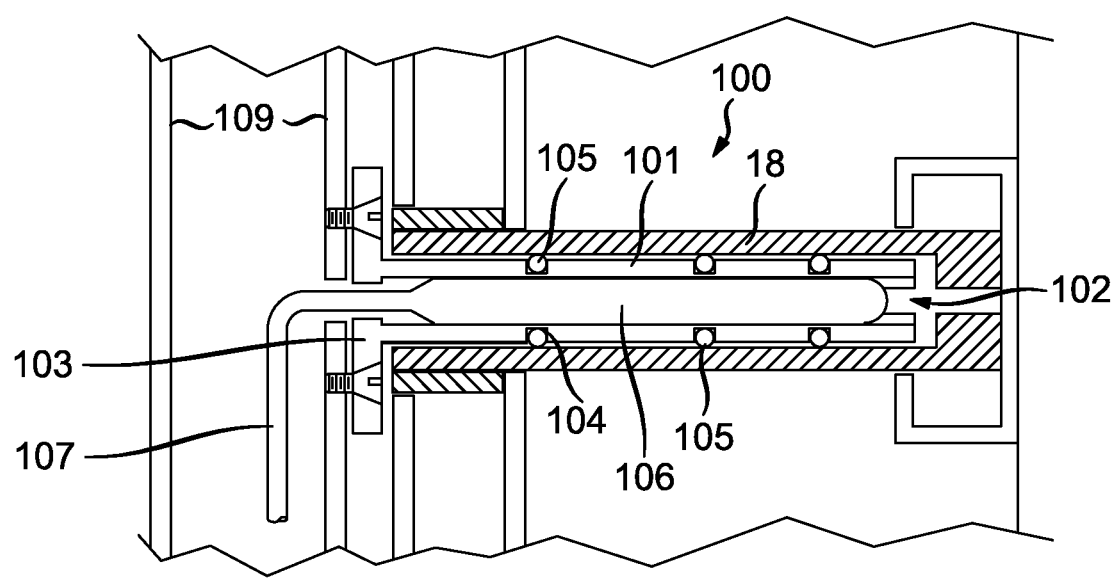

FIGS. 10A and 10B show a design for an expansible finger 100 that is part of the apparatus T. An unexpanded finger 100 is shown in FIG. 10A and an expanded finger 100 inserted into a connecting tube 18 is shown in FIG. 10B. The expansible finger 100 consists of a tube 101 of plastic or metal of slightly smaller external diameter than the internal diameter of the connecting tube 18 and is formed with multiple lengthwise tapered slits 102 that narrow from the open end down to a mounting flange 103 that attaches to a frame member 109 (described more fully with respect to FIG. 11). One or more annular grooves 104 are cut into the tube and each groove contains an O-ring or band 105 of rubber or other elastomeric material. The O-rings or bands 105 are sized to cause the finger tube 101 to be compressed into a conical shape (FIG. 10A) that facilitates insertion of the finger tube 101 into the hollow interior of connecting tube 18. After the finger 100 has been inserted into the connecting tube 18 a bladder 106 inside the tube is inflated, typically with compressed air or hydraulic fluid supplied through hose 107 from a source (not shown). Inflation of the bladder 106 causes the finger tube 100 to expand outwardly and the O-rings expand and become compressed against the inner walls of the connecting tube 18 (FIG. 10B) effectively locking the finger 100 in the connecting tube 18 and enabling handling and transport operations.

Figure 11:
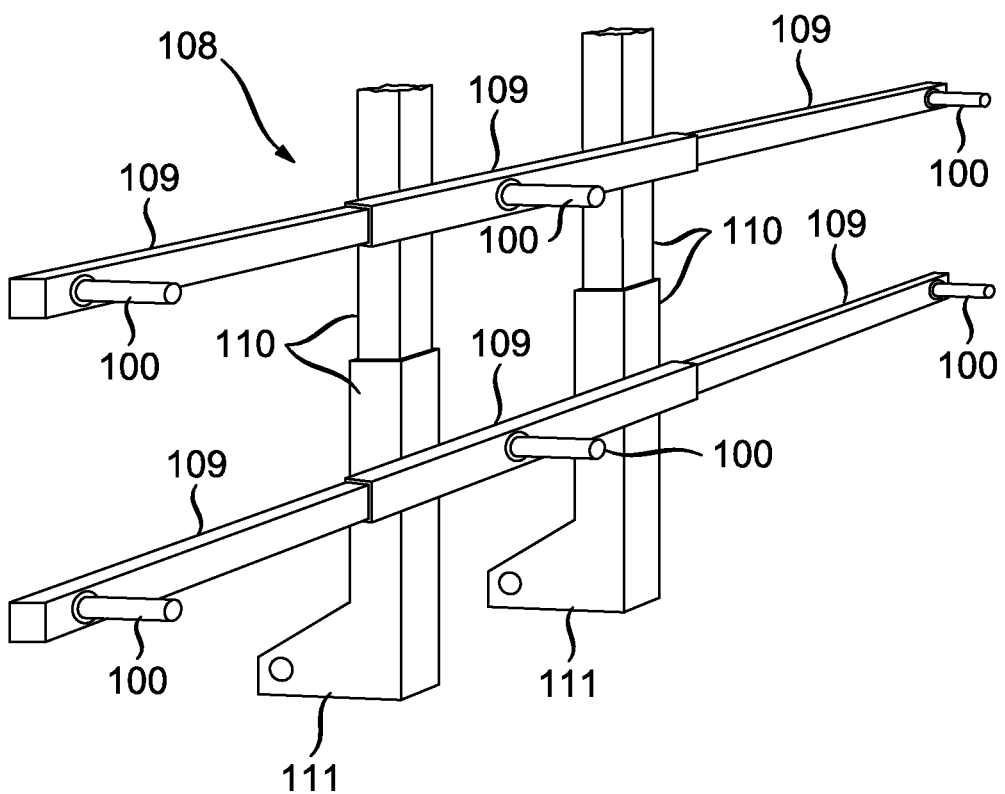
FIG. 11 shows a frame on which the expansible fingers of FIGS. 10A and 10B are mounted for transporting an insulating panel according to the invention.

FIG. 11 shows the expansible fingers of FIGS. 10A and 10B attached to a frame 108 that holds multiple expansible fingers 100 spaced to correspond to the spacing of the connecting tubes 18 in an insulating panel P. FIG. 11 shows a frame 108 with six expansible fingers 100 but the same principles are used in constructing structures holding more or less fingers and the number of gripping points will be determined by a panel's size and structural rigidity. As the drawing shows the expansible fingers 100 are mounted on a frame 108 that has horizontal frame component members 109 joining together with a sliding fit that allows them to be adjusted in a horizontal dimension to properly align the fingers 100 with the connecting tubes 18 on the insulating panel that is to be picked up. The horizontal frame members 109 are attached to vertical frame members 110 joining together with a sliding fit that allows them to be adjusted in a vertical dimension to properly align the fingers 100 vertically. The adjustment of the frame members 109 and 110 may be done manually (e.g. by sliding frame components into position and manually clamping them) or mechanically (e.g. using hydraulic rams or rack drives). The frame members 110 have connectors 111 for attachment of the frame 108 to a mobile transporter.

Figure 12:
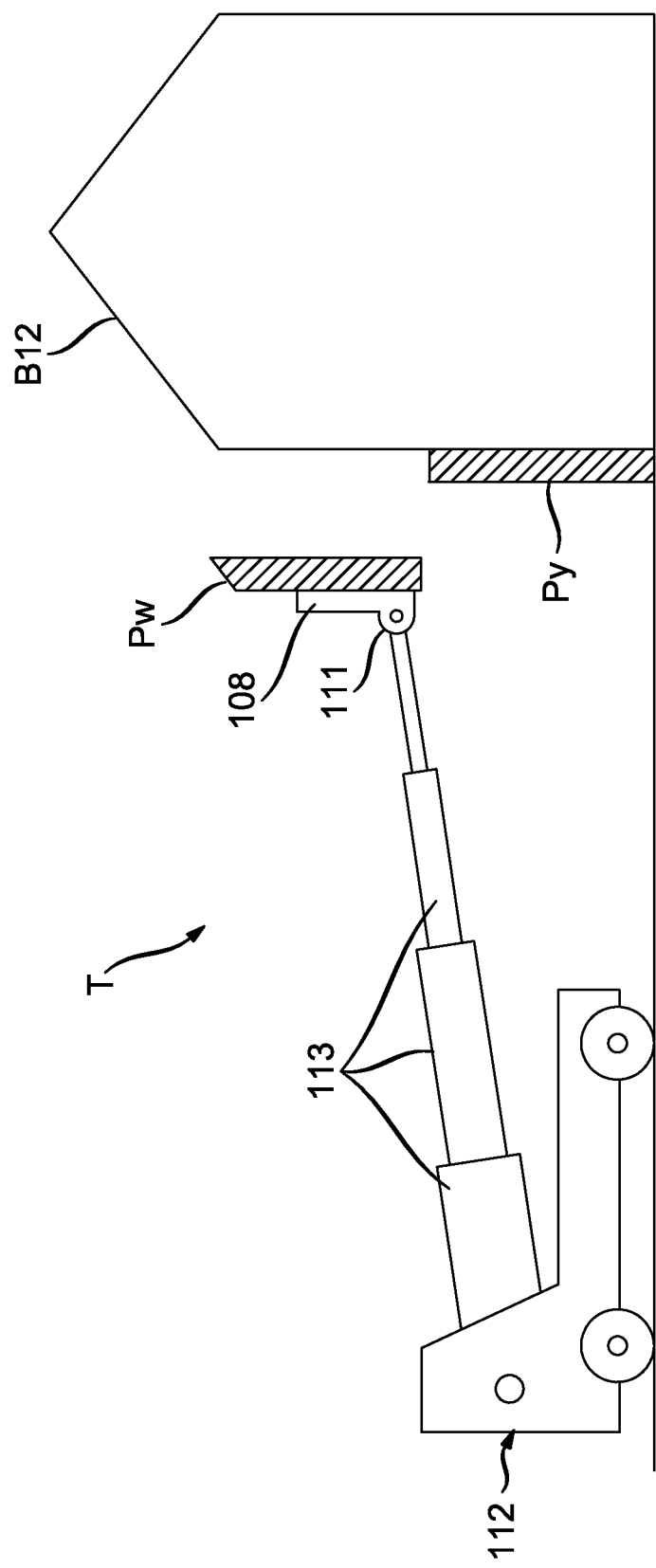
FIG. 12 shows the frame and fingers of FIG. 11 mounted on a mobile transporter for transporting an insulating panel according to the invention.

Frame 108 needs to be maneuvered, so that the unexpanded fingers may be inserted into a panel's connecting tubes 18 and so that after the fingers are expanded to grip the panel securely, the panel may be moved from manufacturing site to a truck or from a truck to a building wall or roof where the panel is secured and expansible fingers contracted and removed. Accordingly, as shown in FIG. 12 the frame 108 of apparatus T is mounted on a maneuverable transporter 112 of a type that is well known and that is widely used in the construction industry to move objects. An example of commercially available equipment suitable to carry frame 108 is a telehandler, a device widely used on construction sites and designed to accommodate a number of different types of accessories and easily adaptable to carry frame 108 with expansible fingers 100. As shown in FIG. 12, the telehandler 112 has hydraulic extension tubes 113 to which the frame 108 is attached and has controls for maneuvering the frame up and down and in and out, as well as rotationally, as well as controls for expanding and contracting the extensible fingers 100. The apparatus T of FIG. 12 illustratively shows frame 108 carrying an insulation panel Pw for installation on building B12 above a previously installed insulation panel Py.

Figure 13:
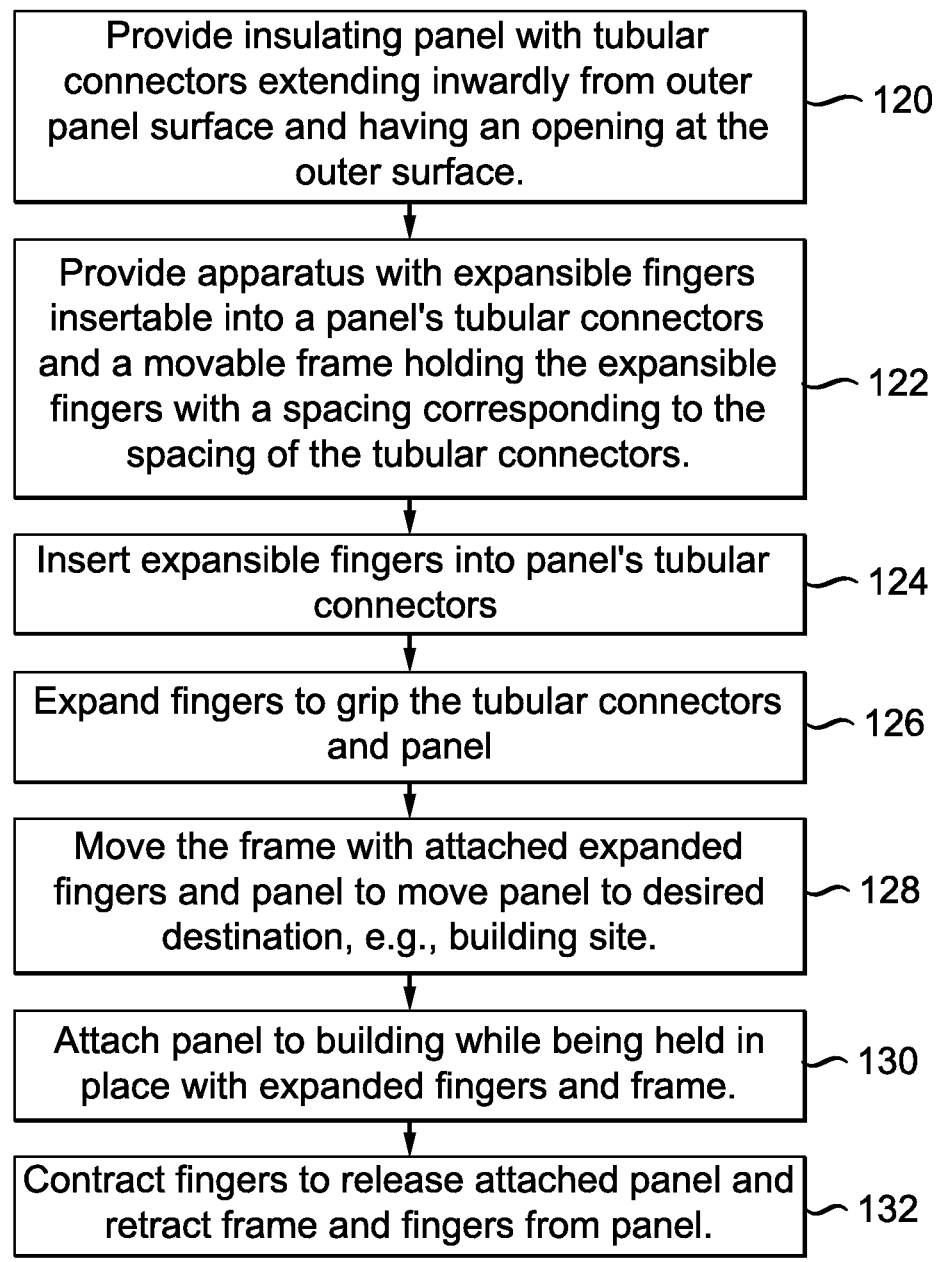
FIG. 13 is a diagram showing a method of transporting an insulating panel according to the invention.

FIG. 13 illustrates a method Mt of using the apparatus T of FIGS. 10A, 10B, 11 and 12 for transporting a foam panel P.

In step 120 of method Mt, an insulating panel is provided with tubular connectors extending inwardly from the panel's outer surface, the tubular connectors having openings at the outer surface.

In step 122, an apparatus is provided that has expansible fingers insertable into the panel's tubular connectors, and a movable frame holding the expandable fingers with a spacing corresponding to the spacing of the tubular connectors.

In step 124, the expandable fingers are inserted into the tubular connectors of the panel, and in step 126 the fingers are expanded to grip the tubular connectors and panel.

In step 128, the movable frame is then moved by, e.g., a telehandler type of transporter as shown in FIG. 12, to deliver the panel to its desired destination, e.g., from factory to truck bed, or from a truck bed to a location adjacent a building surface.

In step 130, the panel may then be attached to the building (as shown for example in FIG. 12) and in step 132 the fingers are contracted to release the attached panel and allow the movable frame and contracted fingers to be retracted.

In this way a large panel without heavy structural members may be securely moved without damage both in a manufacturing facility and at a job site.

Panels made according to the invention open up many opportunities to improve quality and productivity in other parts of the construction process. Some of these are:

Exterior cladding materials such as siding and trim may be precut and prefinished at the factory knowing the precise dimensions of the wall panels.

Holes can be predrilled at precise locations in the exterior stringers at the factory so that siding materials can be accurately located and fastened with screws or rivets Roof cladding panels can be prefabricated for easy installation Interior door and window trims can be preassembled and prefinished at the factory reducing the time to trim out and paint the interior.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. An insulating panel structure for attachment of an exterior cladding material to the exterior of a building, the panel structure comprising:

an inner surface abutting the building exterior, an outer surface to be attached to and support the weight of the exterior cladding material, elongate rigid external stringers extending in a plane along the outer surface of the panel for attachment of the exterior cladding material, elongate rigid internal stringers extending in a plane along the inner surface of the panel for placement against the building exterior, rigid connectors extending perpendicularly from the panel inner surface and secured between the rigid external stringers and the rigid internal stringers to transmit compressive forces from the external stringers to the internal stringers, lateral connectors connected both to the rigid external stringers and to the rigid perpendicular connectors and that extend diagonally upward from the rigid external stringers extending along the outer surface of the panel to the rigid internal stringers extending along the inner surface of the panel, the rigid internal stringers, rigid external stringers, the rigid perpendicular connectors and the lateral connectors forming a framework in which each interconnected lateral connector and rigid perpendicular connector form part of a load-bearing triangle to transmit forces arising from the weight of the exterior cladding material from the rigid external stringers of the panel attaching the cladding material to the rigid internal stringers placed against the building as a tensile force in the lateral connectors and a compressive force in the perpendicular connectors, and insulating foam embedded in the space defined between the panel's inner and outer surfaces, the embedded foam having its outer surface recessed from the panel's outer surface to leave an air space between the foam and the exterior cladding material that is attached to the panel's outer surface, the air space forming a continuous vertical passage allowing air movement.

2. The insulating panel structure claimed in claim 1, where the external rigid stringers are vertical and the internal rigid stringers at the inner surface of the panel structure are horizontal and joined to the external rigid stringers by the perpendicular connectors and by the lateral connectors.

3. The insulating panel structure claimed in claim 1, wherein the only elements bridging the internal and external rigid stringers at the panel's inner and outer surfaces are the perpendicular connectors and lateral connectors and the foam, and wherein the perpendicular connectors and lateral connectors and foam are formed from low thermal conductivity materials to provide thermal insulation between the panel's inner and outer surfaces.

* * * * *